: United States Patent  
Blinn et al.

(10) Patent No.: US 8,234,340 B2
(45) Date of Patent: *Jul. 31, 2012

(54) OUTSOURCING OF INSTANT MESSAGING HOSTING SERVICES (75) Inventors: Arnold Blinn, Bellevue, WA (US); Cynthia Hagan, Seattle, WA (US); Don Gillett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1366 days.

This patent is subject to a terminal disclaimer.

(21) Appl. No.: 11/228,768

(22) Filed: Sep. 16, 2005

(65) Prior Publication Data

US 2007/0067396 A1  Mar. 22, 2007

(51) Int. Cl.
*G06F 15/16* (2006.01)

(52) U.S. Cl. ........ 709/206; 709/203; 709/204; 709/205; 709/207

(58) Field of Classification Search .................. 709/200, 709/203, 204, 206, 207; 345/751, 752, 753
See application file for complete search history.

(56) References Cited

U.S. PATENT DOCUMENTS

| | | | |
|---|---|---|---|
| 5,948,061 A | 9/1999 | Merriman | |
| 6,119,152 A | 9/2000 | Carlin | |
| 6,119,234 A | 9/2000 | Aziz | |
| 6,182,131 B1 | 1/2001 | Dean | |
| 6,249,873 B1 | 6/2001 | Richard | |
| 6,301,609 B1 * | 10/2001 | Aravamudan et al. | 709/207 |
| 6,374,292 B1 | 4/2002 | Srivastava | |
| 6,449,657 B2 * | 9/2002 | Stanbach et al. | 709/245 |
| 6,718,387 B1 | 4/2004 | Gupta | |
| 6,895,431 B1 | 5/2005 | Bero | |
| 6,912,564 B1 * | 6/2005 | Appelman et al. | 709/204 |
| 7,089,325 B1 | 8/2006 | Murtza | |
| 7,130,878 B2 | 10/2006 | Parsons | |
| 7,136,869 B2 | 11/2006 | Holcombe | |
| 7,321,969 B2 * | 1/2008 | Schoen et al. | 713/153 |
| 7,330,971 B1 | 2/2008 | Kukreja | |
| 2001/0043595 A1* | 11/2001 | Aravamudan et al. | 370/356 |
| 2002/0007398 A1* | 1/2002 | Mendiola et al. | 709/206 |
| 2003/0163730 A1 | 8/2003 | Roskind | |
| 2003/0172145 A1 | 9/2003 | Nguyen | |
| 2004/0003251 A1* | 1/2004 | Narin et al. | 713/172 |
| 2004/0030887 A1* | 2/2004 | Harrisville-Wolff et al. | 713/155 |
| 2004/0059712 A1 | 3/2004 | Dean | |
| 2004/0111644 A1* | 6/2004 | Saunders et al. | 713/202 |
| 2004/0168055 A1* | 8/2004 | Lord et al. | 713/156 |

(Continued)

OTHER PUBLICATIONS

Duncan Mackenzie and Joel Semeniuk, "Exchange & Outlook®: Constructing Collaborative Solutions", Jun. 2000, David Dwyer, First Edition, Part III: Appendix C.—Instant Messaging Services.*

(Continued)

*Primary Examiner* — Haresh N Patel
*Assistant Examiner* — Peter Shaw
(74) *Attorney, Agent, or Firm* — Shook, Hardy & Bacon LLP (57) ABSTRACT

A system, a method and computer-readable media for initiating the hosting of instant messaging services for an Internet domain name. A request is received from an entity requesting initiation of instant message hosting services for a domain name, and a secure communication channel is established with this entity. After verifying that the requesting entity is authorized to control the domain name, information describing user accounts having the domain name is received, and instant messaging services are provided for the user accounts.

13 Claims, 5 Drawing Sheets

U.S. PATENT DOCUMENTS

| | | | |
|---|---|---|---|
| 2004/0172456 A1* | 9/2004 | Green et al. | 709/207 |
| 2004/0250129 A1* | 12/2004 | Clough et al. | 713/201 |
| 2005/0192899 A1 | 9/2005 | Reardon | |
| 2005/0198386 A1* | 9/2005 | Accapadi et al. | 709/245 |
| 2005/0216587 A1 | 9/2005 | John | |
| 2005/0289084 A1 | 12/2005 | Thayer | |
| 2006/0026237 A1* | 2/2006 | Wang et al. | 709/206 |
| 2006/0101113 A1 | 5/2006 | Lemson | |
| 2006/0174018 A1* | 8/2006 | Zhu et al. | 709/229 |
| 2006/0218303 A1* | 9/2006 | Adelman et al. | 709/245 |
| 2006/0230380 A1* | 10/2006 | Holmes et al. | 717/117 |
| 2006/0265589 A1* | 11/2006 | Murtza et al. | 713/168 |
| 2007/0112627 A1 | 5/2007 | Jacobs et al. | |

OTHER PUBLICATIONS

Andy Koopmans et al., "Microsoft® Exchange 2000 Server Resource Kit", Aug. 30, 2000, Microsoft Press, Part 5: Chapter 19.—Instant Messaging Overview.*

J.B. Postel, "Simple Mail Transfer Protocol," RFC 821, Information Sciences Institute, University of Southern California, Aug. 1982.

J. Myers, "Post Office Protocol—Version 3," RFC 1939, Carnegie Mellon, May 1996.

P. Mockapetris, "Domain Names-Implementation and Specification," RFC 1035, Information Science Institute, University of Southern California, Nov. 1987.

Y. Rekhter, "Interaction Between DHCP and DNW," Internet Draft, draft-ietf-dhc-dhcp-dns-04.tx, May 1997.

Microsoft Active Directory and Active Directory Services Interfaces, TechNET Website; under Windows NT 40; Active Directory—Download link, 2 pages, 1998.

ICANN Policy on Transfer of Registrations between Registrars, Jul. 12, 2004, http://www.icann.org/en/transfers/policy-12ju104.htm, pp. 1-3.

* cited by examiner

OUTSOURCING OF INSTANT MESSAGING HOSTING SERVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The Internet has become a ubiquitous source of information and resources, allowing millions of people around the world to easily exchange information and communications. For example, web sites accessible over the Internet often provide a wide variety of information and content. By publishing content on a web site, authors can share their works with audiences around the world, while retailers can introduce their products to countless potential new customers. Internet users can also exchange electronic communications in the form of e-mail, instant messages and other types of messages. These communications are facilitated by communication servers, which are able to send and receive messages over the Internet.

Each device connected to the Internet must have at least one Internet protocol (IP) address. For example, a server hosting a web site or an Internet communication service must have an IP address. An example IP address is 12.10.38.33. An IP address is a unique number, similar in concept to a telephone number, used by devices to refer to each other when sending information through the Internet. This allows machines passing the information onwards on behalf of the sender to know the intended destination.

IP addresses, however, are difficult to remember and are not descriptive of the Internet locations to which they correspond. Accordingly, IP addresses may be associated with a domain name that may be used instead of an IP address to direct traffic to a network location. Domain names are much easier to remember and use than their corresponding IP addresses. For example, instead of using various IP addresses to refer to various locations in a company's network, the company may purchase the domain name "company.com." In this case, the company's website may reside at www.company.com, while employees of the company may be given email addresses having this domain name (e.g., user@company.com).

In order to translate a domain name into its corresponding IP addresses, a Domain Name Service ("DNS") must be utilized. The DNS includes a system of servers (referred to as DNS servers or name servers) that maintain a database for resolving domain names and IP addresses. For example, an attempt to access "www.company.com" may be directed by the DNS to the IP address 12.10.38.33. This conversion allows users to connect to remote computers by inputting domain names instead of IP addresses. Many types of information can be stored in a DNS record, and DNS provides physical locations (i.e., IP addresses) associated with various services in each domain name. Further, the DNS records may list the mail exchange servers and instant messaging servers for each domain. In sum, DNS facilitates access to information and services associated with a given domain name by providing the IP addresses of devices providing such domain services.

Domain names are often company trademarks, personal names or short phrases concatenated with an extension (e.g., .com, .net, .org, .us, .biz, etc.). For example, businesses and other entities often obtain custom domain names incorporating their trademarks. Individuals may also obtain custom domains (e.g., johnsmith.com). To obtain ownership and control over an Internet domain name, users must interact with a registry accredited by the Internet Corporation for Assigned Names & Numbers (ICANN). If a requested domain name is available, the user may purchase the name and may proceed, for example, in creating a web site or setting up domain e-mail.

As part of this domain set-up, the user must specify the IP addresses associated with the domain for publishing in the domain's DNS record. As previously mentioned, the DNS record lists IP addresses associated with various services offered by the domain. Alternately, the DNS record may list host names for the services. A DNS record may include a Mail eXchange record (also referred to as a MX record). The MX record maps a domain name to a list of mail exchange servers for that domain. Similarly, a DNS record may indicate a web server where web pages are hosted for a web browser (referred to as an A-Record), while a Session Initiation Protocol (SIP) related-record may map to services such as instant messaging services for a domain. As known to those skilled in the art, SIP related DNS records may include SRV and NAPTR records. A DNS entry may also include a Text record where any arbitrary text may be placed. Importantly, the DNS record associated with a domain name, while accessible to the public, generally is only editable at the direction of the entity in control of the domain (e.g., the domain owner).

Though a domain owner may control the various IP addresses/host names listed in a DNS record, the owner need not control the devices residing at these addresses. For example, a domain owner may outsource the hosting of web pages within the domain. In this example, web-hosting services may be provided by a third party who owns a server connected to the Internet. The server may provide a web site having the domain name, and the domain's DNS record may point requests for this web site to the third party's server. By allowing a third party to host web pages for the domain, the domain owner need not incur the costs of server ownership, setup and initiation. Alternatively, the domain owner can shop for the best price/performance of web hosting from various providers and may then update the domain's DNS record to point to the server of a preferred provider.

While outsourcing of web-hosting services is well known in the art, a variety of difficulties currently exist for outsourcing of instant message hosting services. For example, instant message hosting services require creation and administration of user accounts. These actions may be burdensome even for a relatively small number of users. Also, given high set-up and maintenance fees, hosting services today may be too expensive for domain owners having limited resources and/or small numbers of users. Further, to initiate hosting services, a domain owner must often edit their DNS record. This DNS editing, however, is often confusing and difficult for domain owners who lack DNS expertise. Further, difficulties often arise in verifying ownership or control of a domain name, making it difficult to determine whether the entity requesting outsourcing is truly authorized to make such a request.

SUMMARY

The present invention meets the above needs and overcomes one or more deficiencies in the prior art by providing a system and method for initiating the hosting of instant messaging services for an Internet domain name. In one embodiment, a request is received from an entity requesting initiation of instant message hosting services for a domain name, and a secure communication channel is established with this entity. After verifying that the requesting entity is authorized to control the domain name, information describing user accounts having the domain name is received, and instant messaging services are provided for these user accounts. It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides improved systems and methods for initiating web hosting services. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
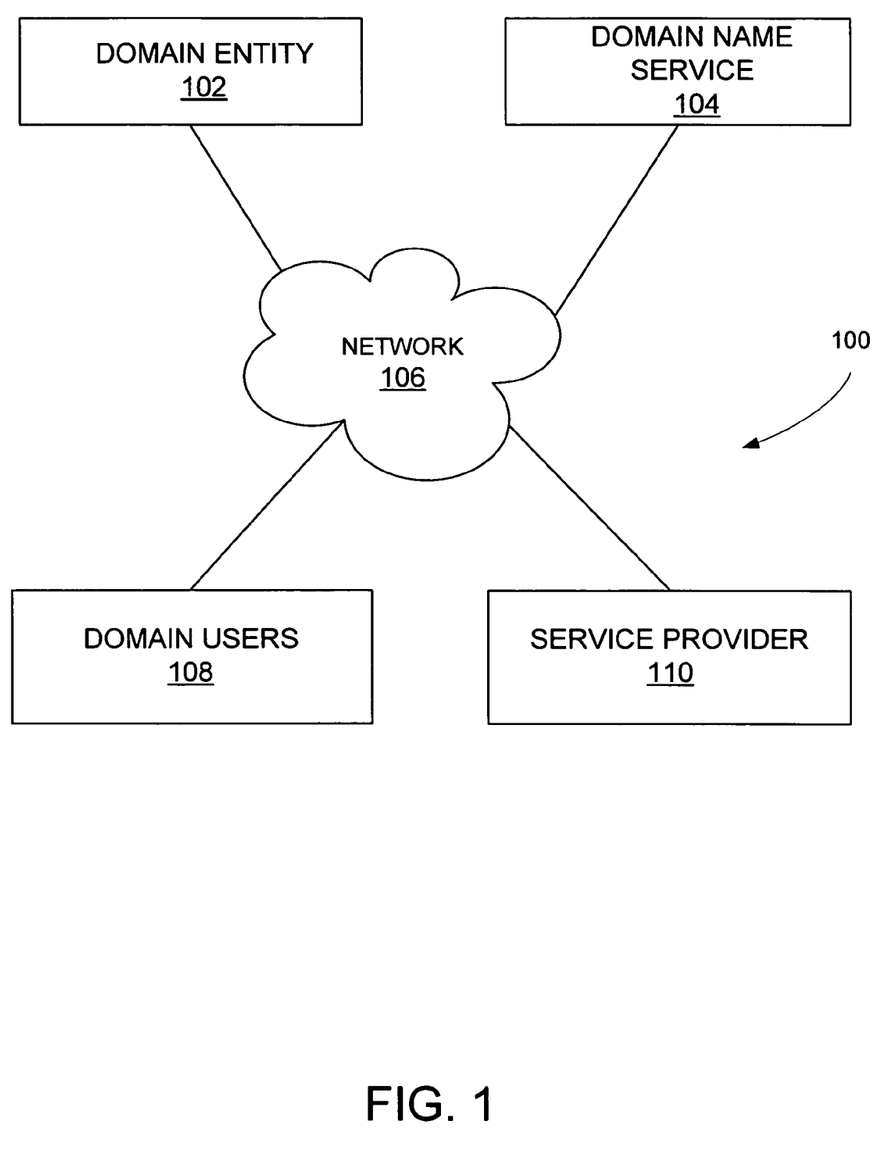
FIG. 1 is a block diagram of a computing environment suitable for use in implementing the present invention.

FIG. 1 illustrates a system 100 that represents an exemplary environment in which the present invention may be practiced. The system 100 includes a domain entity 102. The domain entity 102 may be any person or organization having control over a domain name. For example, the domain entity 102 may have purchased "johnsmith.com" from an ICANN accredited registry. Each person or organization in control of the domain name may comprise the domain entity 102.

The system 100 also includes a domain name service 104 ("DNS 104"). The DNS 104 includes a listing of IP addresses and other information associated with the domain name controlled by the domain entity 102. For example, the DNS 104 may include an IP address or host name associated with email, instant messaging services and/or web-hosting services. The DNS 104 allows domain users 108 to access the services associated with the domain name over the network 106. The network 106 may be any network, such as the Internet. In operation, when a request from one of the domain users 108 is received over the network 106, the DNS 104 is configured to route this request to an appropriate device. For example, a request from one of the domain users 108 may seek to access content at wwwjohnsmith.com. This request will be translated by the DNS 104 into an IP address associated with a server hosting a web site for www.johnsmith.com. While any number of organizations may provide DNS services, only the domain entity 102 may control the DNS record associated with its domain name. This control may be accomplished by registering a nameserver for the domain that is stored with the registry.

A service provider 110 is also included in the system 100. The service provider 110 may provide any number of web services associated with the domain name controlled by the domain entity 102. For example, the service provider 110 may provide email, instant messaging or web hosting services. In one embodiment, the service provider 110 maintains a server on the network 106 that provides the services, and the DNS record maintained by the DNS 104 includes the IP address associated with this server. The service provider 10 may provide email services for accounts having the domain name johnsmith.com. When an incoming email is sent to user@johnsmith.com, this email may be directed to the IP address associated with the service provider 110 and indicated by the DNS 104. Accordingly, the service provider 110 will receive the email and can provide email access for the account user@johnsmith.com. Such email access may be provided in any number of interfaces. For example, the access may be provided in a web-based interface accessible over the network 106. As will be appreciated by those skilled in the art, by pointing the DNS records associated with a domain name to instrumentality controlled by the service provider 110, the service provider 110 is enabled to host any number of services and operations in connection with a domain name.

Figure 2:
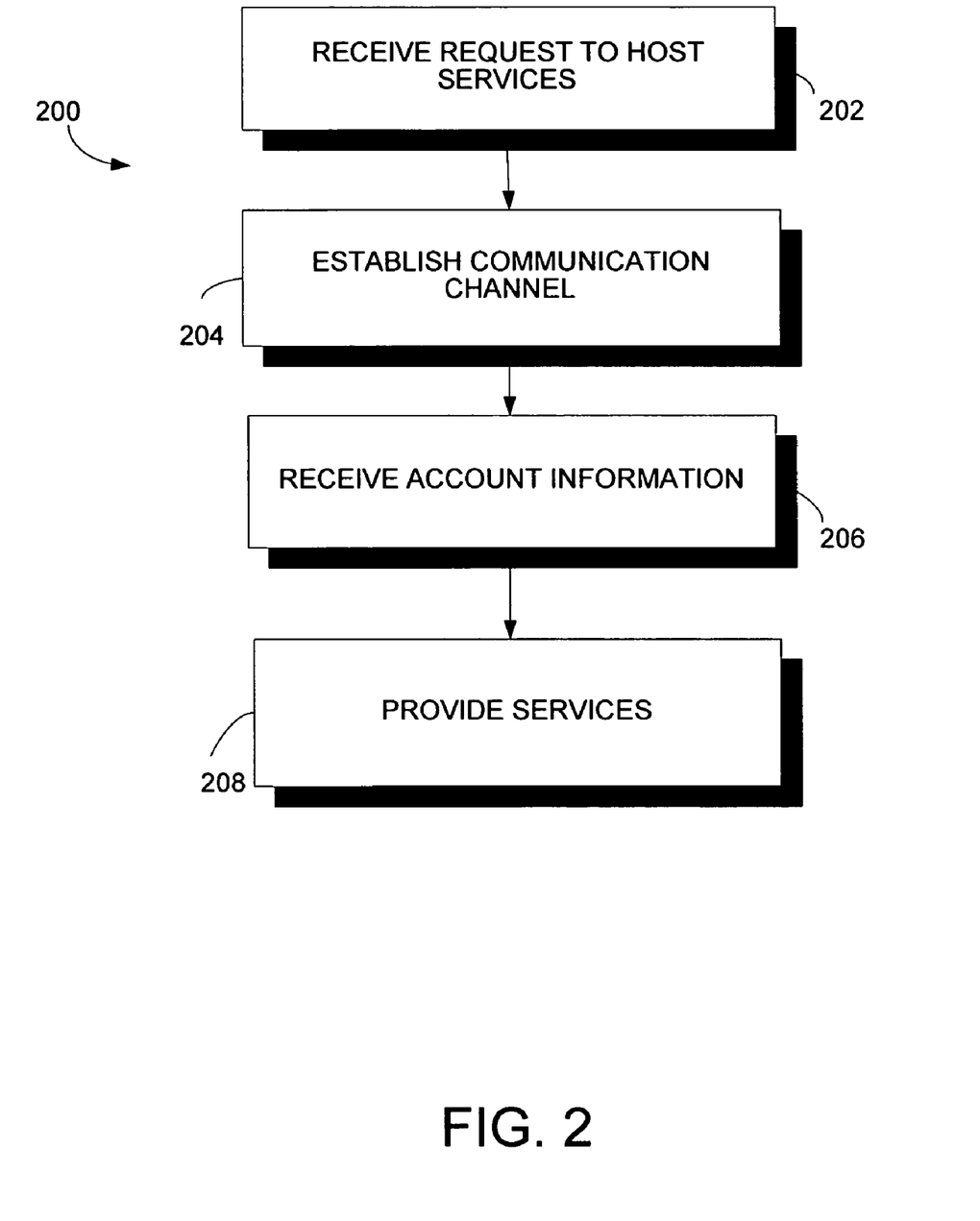
FIG. 2 is a flow diagram showing a method for initiating instant messaging hosting services in accordance with an embodiment of the present invention.

FIG. 2 provides a method 200 for initiating instant messaging hosting services in connection with a domain name. At 202, the method 200 receives a request for initiation of hosting services. As will be appreciated by those skilled in the art, any number of services may be hosted for a domain name. For example, email or instant messaging services may be hosted. In one embodiment, the owner of the domain name submits the hosting request to an outsourcing entity. This request may be communicated via any number of electronic or non-electronic channels and may request hosting of multiple services. For example, the owner of johnsmith.com may submit a request for email and/or instant message hosting services in connection with his domain.

At 204, the method 200 establishes a secure communication channel with the domain owner. Any number of communication channels, including email and web-based interfaces, may be utilized for the secure communication channel. The domain owner and the outsourcing entity may exchange a variety of information via the secure channel. For example, the exchanged information may relate to the type of services desired, instructions for initiating services and/or information about the domain owner. Information for verifying ownership and control of the domain name may also be exchanged. In one embodiment, information related to editing the DNS record associated with the domain name is communicated over the secure communication channel. As will be appreciated by those skilled in the art, by establishing a secure communications channel, the domain owner and the hosting entity may communicate all the information necessary to initiate the hosting services.

The method 200, at 206, receives account information describing user accounts having the domain name. The account information may be received from the domain owner or from domain users. In one embodiment, the domain owner is provided a set of account management controls. Using these controls, the domain owner may enter the account information and manage accounts having the domain name. For example, the domain owner may create the accounts user1@domain-name.com and user2@domain-name.com. It should be noted that the account information may be received via a user interface or may be imported from a file or data store.

At 208, the method 200 provides the requested services for the user accounts. In one embodiment, a domain user associated with the account user1@domain-name.com may possess the login credentials for this account. By accessing a domain web site (i.e., www.domain-name.com), the user may be directed to a web-based interface for submitting the login credentials. Alternatively, the services may be client-based (e.g., provided via a client application). Subsequently, the user may be granted access to the services hosted by the outsourcing entity. The user may receive emails addressed to user1 @domain-name.com and may send and receive instant messages with this account name. Techniques for providing users such services are well known in the art. As will be appreciated by those skilled in the art, the requested services may be presented in a variety of interfaces, and any number of presentation techniques may be acceptable for providing the services to the domain users.

Figure 3:
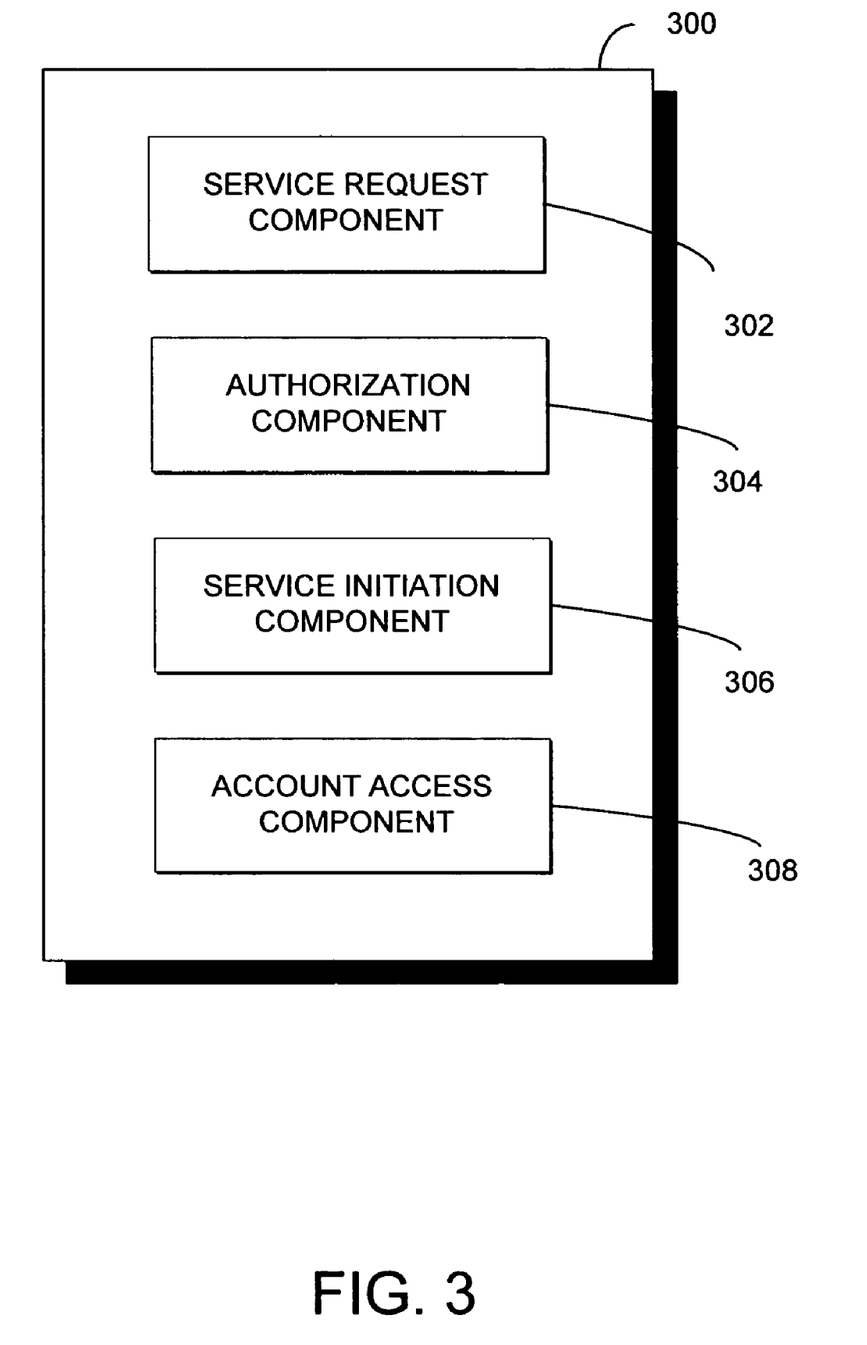
FIG. 3 is a block diagram of a system for providing hosting instant messaging services for a domain name in accordance with an embodiment of the present invention.

FIG. 3 illustrates a system 300 for providing instant messaging hosting services for a domain name. The system 300 includes a service request component 302 configured to receive requests for initiation of hosting services. Such hosted services include email and instant messaging. In one embodiment, a hosting entity promotes its hosting services in a variety of different communications. Responsive to one of these promotions, a domain owner may submit a request to the service request component 302. This request may be received, for example, via a web-based interface. Optionally, the service request component 302 may provide the domain owner login credentials for use in accessing restricted-access content concerning the establishment of the hosting services.

The system 300 also includes an authorization component 304 configured to verify that the request originates from an entity authorized to control the domain name. A variety of techniques may be used to verify a requestor's control over a domain name. Further, the authorization component 304 may periodically re-verify the domain ownership. In one embodiment, the authorization component 304 may securely publish an authorization code to the requester. Any value may be used as the authorization code. For example, the authorization code may be an IP address or may be a unique token such as a globally unique identifier (GUID). The authorization token may be unique to the user making the request and may be stored by the system 300. The authorization code may be displayed to the requestor on a restricted-access web page. Following receipt of the authorization code, the requestor may publish this information inside the DNS record associated with the domain name. Later, the authorization component 304 may check the DNS record for the authorization code. As the system 300 may store the authorization token, it can verify that the published value matches the expected value. If the expected authorization code exists in the DNS record, the authorization component 304 will conclude the requester is, in fact, an entity in control of the domain name and will allow initiation of hosting services. As will be appreciated by those skilled in the art, because only the domain owner is able to edit the DNS record, the existence of the corresponding authorization code in the DNS record demonstrates ownership/control of the domain name by the requestor. It should be noted that the foregoing validation technique is provided merely as an example and that a variety of ownership validation methods may be implemented by the authorization component 304. For example, the authorization code may also be published on the website as an extensible Markup Language (XML) file.

A service initiation component 306 is also included in the system 300. The service initiation component 306 may be configured to provide a variety of information related to initiation of the hosting services. In one embodiment, the DNS record associated with the domain name may need to be edited to include network locations (IP addresses or host names) associated with the hosting services. For example, editing the MX record will allow domain email to be routed to an email server controlled by the hosting service. Further, the SIP record may indicate an IP address where instant messages may be routed. Other services may also be associated with a SIP record. The service initiation component 306 may provide the domain owner instructions concerning editing the DNS record or may provide automated tools for enabling editing of the DNS record. As will be appreciated by those skilled in the art, once the DNS record associated with a domain is edited, messages sent to user accounts having the domain name will be routed to the specified network locations. The service initiation component 306 may also receive account information describing accounts having the domain name. This information may be entered via a web-base user interface. For large number of accounts, the account information may be imported from a spreadsheet/text file or from an application-program interface (e.g., an XML application-program interface (API), a simple object access protocol (SOAP) API, or a hypertext transfer protocol (HTTP) API). Once the account information is submitted, the service initiation component 306 may create instant messaging accounts associated with the accounts and may perform other operations related to initiating hosting services for the domain users.

The system 300 also includes an account access component 308 configured to provide domain services for the user accounts. In one embodiment, each user is provided login information. Using this login information, the users can access email and/or instant messaging services. For example, a user may initiate a communications application on their local device that provides a user interface. The account access component 308 may communicate messages to this application for presentation to the user. As will be appreciated by those skilled in the art, the account access component 308 may provide the domain services in a variety of different interfaces and in accordance with a variety of different presentation techniques.

Figure 4:
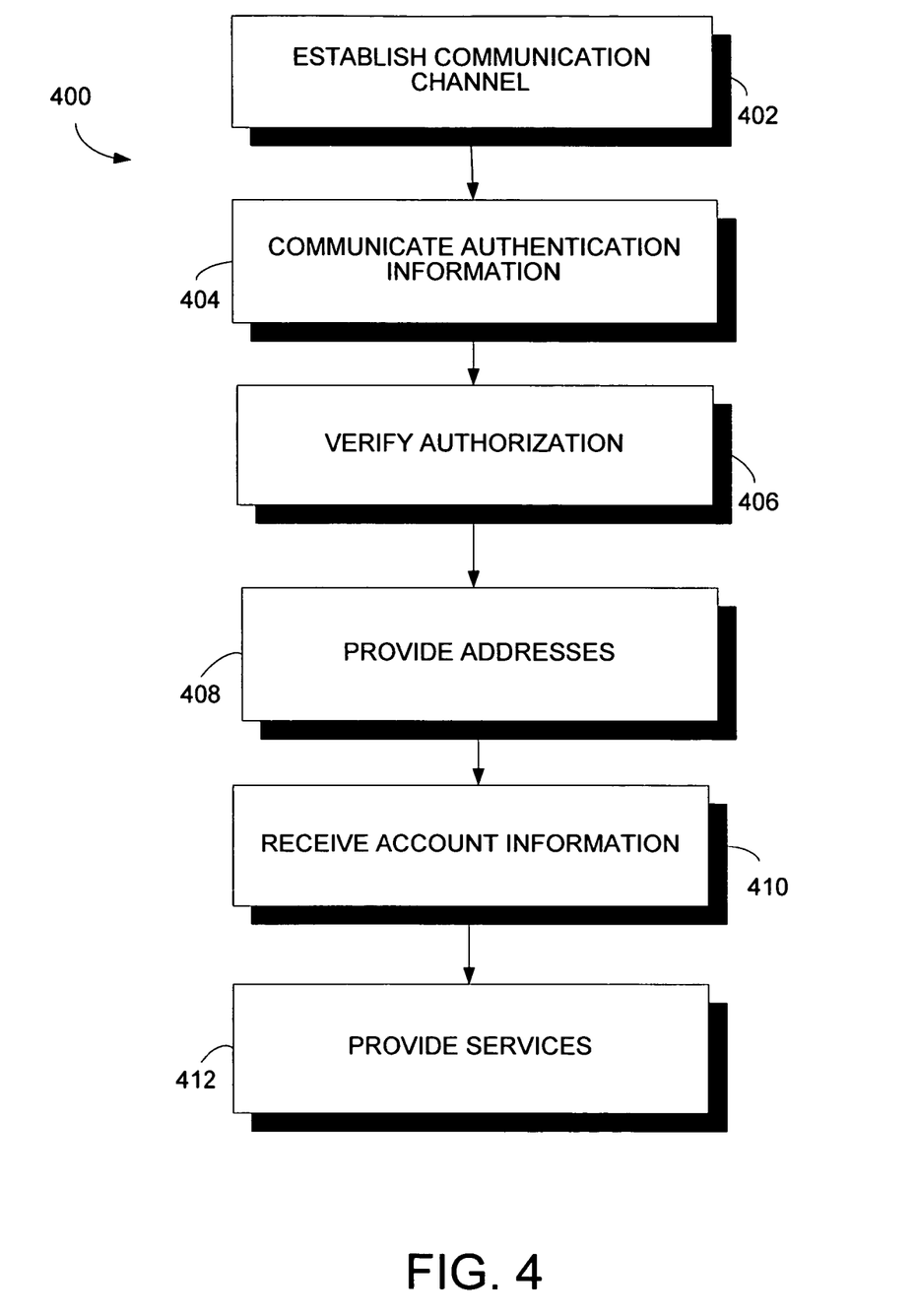
FIG. 4 is a flow diagram showing a method for initiating instant messaging hosting services in accordance with an embodiment of the present invention.

FIG. 4 provides a method 400 for initiating instant messaging hosting services for a domain name. At 402, the method 400 establishes a secure communication channel with an entity requesting hosting services for a domain name. For example, a request may be received concerning initiation of services for accounts having the domain name johnsmith.com.

The method 400, at 404, communicates authentication information to the requesting entity via the secure communication channel. The authentication information may be utilized to verify the identity of the requesting entity and to determine whether the entity is authorized to control the domain name. Accordingly, the authentication information may include personally identifying information, or some other unique value stored by the method 400. The authentication information may also include a code to be published in a location associated with the domain name, such as in a DNS record or web site.

At 406, the method 400 verifies that the requesting entity is authorized to control the domain name. In one embodiment, the authentication information is utilized in this verification. For example, if the authentication information is a code published in a location associated with the domain name, the method 400 may verify the entity's control over the domain name by accessing the location and observing the published code. Other techniques exist in the art for verifying ownership/control over a domain name. For example, the DNS record associated with a domain may include information about the domain's owner. As domain control may change over time, the verification process may be periodically repeated. Also, when domains have multiple owners, it may be desirable to verify the ownership of each entity. For example, each owner may be provided a different code for publishing in a DNS record. If one of these codes is removed from the DNS, the method 400 may no longer recognize the entity associated with the missing code as an owner. As will be appreciated by those skilled in the art, any number of ownership/control validations may be utilized by the present invention, and numerous policies may be implemented to track the control of a domain name.

At 408, the method 400 provides destination addresses to network locations configured to receive communications addressed to users of the domain name. As previously discussed, the DNS record associated with a domain name contains a listing of IP addresses that correspond to network locations associated with various services. For example, the DNS record may list the IP address of a server configured to accept emails for the domain. By providing destination addresses, the domain owner or other entity is able to edit the DNS record and to enable the routing of communications to servers configured to provide outsourcing services.

The method 400, at 410, receives account information describing accounts having the domain name. The account information may be received from a variety of sources and may be submitted via a user interface or imported from other sources. The information may include a variety of information about the users. For example, the account information may indicate a user's email address, name, contact information and password. Once the account information is received, a variety of account maintenance operations may be performed. For example, inboxes may be created to handle messages directed to user accounts, or instant messaging accounts may be created. Further, a set of policies and administrative options may be associated with each account.

At 412, the method 400 provides services for the accounts. For example, instant messaging and email services may be performed, and a domain user may be provided account login information to access to the services. As will be appreciated by those skilled in the art, providing email and instant messaging services are well known in the art, and a variety of techniques may be utilized to implement such services.

Figure 5:
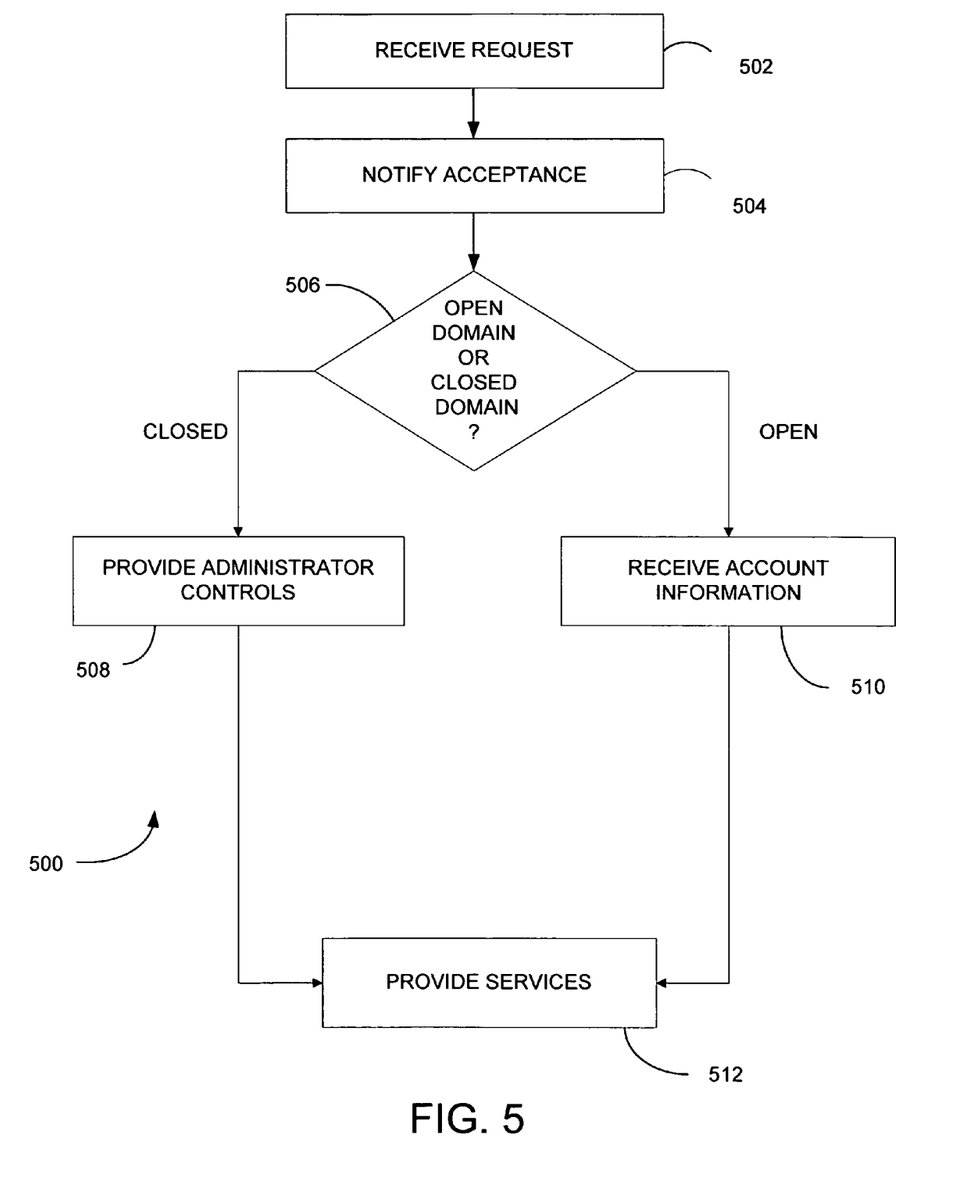
FIG. 5 is a flow diagram showing a method for initiating instant messaging hosting services for an Internet domain name in accordance with an embodiment of the present invention.

FIG. 5 illustrates a method 500 for initiating instant messaging hosting services for an Internet domain name. At 502, the method 500 receives a request from an entity seeking establishment of hosting services for the domain name. A variety of communications may be exchanges related to this request. At 504, the method 500 notifies the requesting entity acceptance of the request. In one embodiment, this acceptance is provided in response to verification that the request originates from an entity authorized to control the domain name.

Prior to the initiation of services, the requesting entity may be provided a variety of different service options. A portion of these options may relate to administrative controls maintained by the entity over the hosted accounts. As one option, at 506, the requesting entity may indicate whether a "closed domain" or an "open domain" is desired. An open domain allows anyone to sign-up for an account having the domain name, while a closed domain limits accounts to selected users explicitly created by the domain owner. If the entity selects a closed domain, at 508, the method 500 provides a set of administrative controls for managing the user accounts having the domain name. The requesting entity may appoint other administrators for the domain, and a user interface may provide the set of administrative controls. In one embodiment, the requesting entity must approve the creation of each user account. As an example, a family may own the domain name johnsonfamily.com. The family may desire a closed domain so as to prevent non-family members from using their domain name. In this example, each user account must be created and managed by the domain's administer. In one embodiment, the administrator may also provide a legacy e-mail server (e.g. Pop3.mydomain.com) and a password. Using this information, the method 500 may migrate mail from the old server to the new server.

Alternately, the domain owner may select an open domain, and, at 510, the method 500 may receive account information from a variety of different sources. In one embodiment, open domains do not provide the extensive administrative controls afforded to closed domains. For example, a domain owner may maintain a web site, www.SuperRacerFans.org, devoted to players of the video game "Super Racer." One way to promote this website may be to offer email accounts having the domain name SuperRacerFans.org (i.e., user@SuperRacerFans.org). These accounts may be advertised by a link on www.SuperRacerFans.org that directs users to an email sign-up page. In this example, anyone may sign up for a hosted email accounts, so account management controls may not be of interest to the domain owner. In one embodiment, the domain owner may create/administer a portion of the accounts, while additional accounts may be open to creation by other users.

The method 500, at 512, provides the requested services for the user accounts having the domain name. As previously discussed, the services may be presented in a variety of different interfaces and may utilize any number of techniques known in the art to provide services such as email and instant messaging.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for initiating instant message hosting services for user accounts having a domain name, said method comprising:
   receiving an indication from an entity that said entity exercises control over said domain name;
   receiving from said entity a request for initiation of instant message hosting services for said domain name;
   establishing a secure communication channel with said requesting entity;
   providing an authorization code to said requesting entity via said secure communication channel;
   verifying that said requesting entity is authorized to control said domain name via determining whether said requesting entity published said authorization code in a publicly viewable Domain Name Service (DNS) record associated with said domain name, thereby making said authorization code publicly viewable;
   incident to verifying that said entity is authorized to control said domain name, providing instructions for publishing at least one Internet protocol address or host name associated with instant message hosting services in a DNS record associated with said domain name;
   receiving account information from said requesting entity describing one or more user accounts having said domain name;
   providing an account administration interface for providing said requesting entity a set of administrative controls over said one or more user accounts; and
   providing instant messaging services for said one or more user accounts.

2. The method of claim 1, wherein said providing instant messaging services includes providing a network-based interface for accessing said one or more user accounts.

3. The method of claim 1, further comprising verifying that a domain user requesting creation of one of said one or more user accounts is authorized to utilize said instant messaging services.

4. One or more non-transitory computer storage media having computer-useable instructions embodied thereon to perform the method of claim 1.

5. A computer-system for providing instant message hosting services for a plurality of domain names, said computer-system comprising:
   a service request component configured to receive one or more requests for initiation of instant message hosting services for at least one of said plurality of domain names, wherein said service request component is stored on said computer-system and said one or more request includes an indication that an entity exercises control over at least one of said plurality of domain names;
   an authorization component configured to verify that each of said one or more requests originates from an entity authorized to control at least one of said plurality of domain names, wherein said authorization component is configured to provide an authorization code to said entity in response to said request, and then determine whether said entity published said authorization code in a publicly viewable DNS record associated with at least one of said plurality of domain names, thereby making said authorization code publicly viewable;
   an account administration component configured to receive account information for one or more user accounts having one of said plurality of domain names;
   an account administration interface configured to provide said entity a set of administrative controls over said one or more user accounts; and
   a messaging component configured to provide instant messaging services for at least a portion of said one or more user accounts.

6. The system of claim 5, wherein at least a portion of said one or more requests include a request for initiation of email hosting services.

7. The system of claim 6, further comprising an email access component configured to provide domain email services for at least a portion of said one or more user accounts.

8. The system of claim 5, wherein said account administration component is configured to provide a user interface for receiving at least a portion of said account information.

9. The system of claim 5, wherein said account administration component is configured to receiving at least a portion of said account information by importing said account information from a file.

10. A computer-implemented method for initiating instant message hosting services for a domain name, said method comprising:
   receiving an indication from an entity that said entity exercises control over said domain name;
   receiving a request from said entity to establish instant message hosting services in connection with a domain name;
   incident to receiving said request, providing at least one authorization code to said entity, wherein said entity is to publish said authorization code in a publicly viewable DNS record associated with said domain name, thereby making said authorization code publicly viewable;
   verifying that said requesting entity is authorized to control said domain name via observing said publicly viewable DNS record associated with said domain name and comparing said publicly viewable DNS record with said authorization code;
   notifying said requesting entity of acceptance of said request;
   receiving account information for creating one or more user accounts having said domain name;
   providing an account administration interface for providing said requesting entity a set of administrative controls over said one or more user accounts; and
   providing instant messaging services for said one or more user accounts.

11. The method of claim 10, wherein said providing instant messaging services includes providing a network-based interface for receiving instant messages.

12. The method of claim 10, wherein said providing instant messaging services includes exchanging instant messages with user accounts having domain names other than said domain name.

13. The method of claim 10, wherein said method further comprises providing a user interface that includes controls for administering at least a portion of said one or more user accounts.

* * * * *